June 10, 1930.  A. O. ABBOTT, JR  1,762,752
METHOD OF AND APPARATUS FOR MANUFACTURING PNEUMATIC TIRES
Filed March 15, 1928
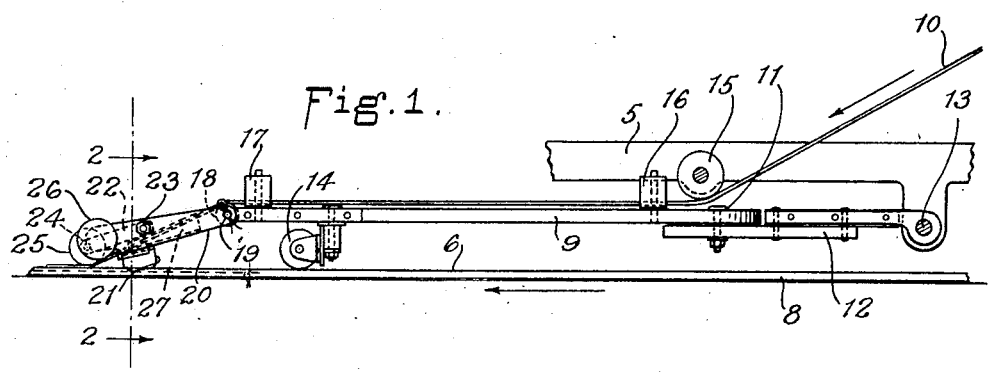
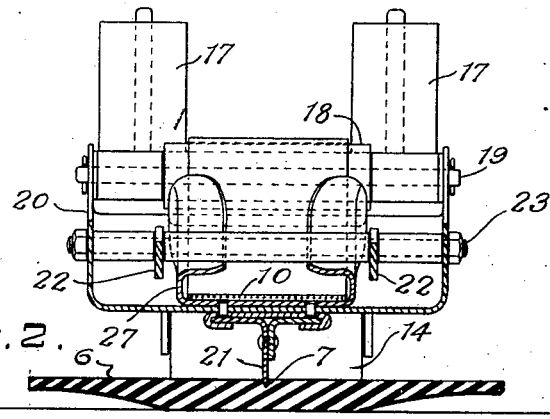
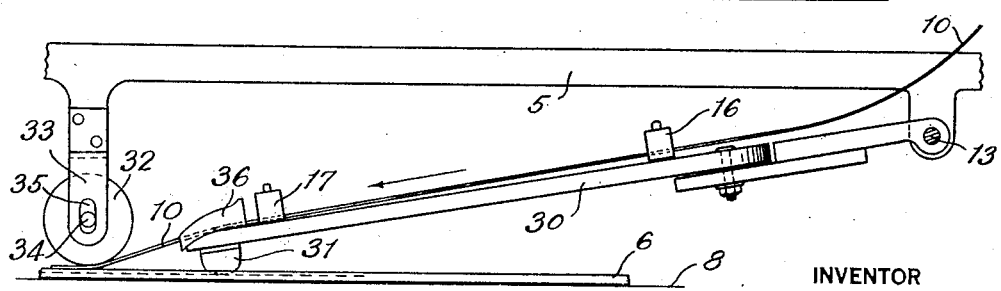
INVENTOR
Adrian O. Abbott
BY
Ernest Hopkins
ATTORNEY Patented June 10, 1930

1,762,752

UNITED STATES PATENT OFFICE

ADRIAN O. ABBOTT, JR., OF DETROIT, MICHIGAN, ASSIGNOR TO MORGAN AND WRIGHT, OF DETROIT, MICHIGAN, A CORPORATION OF MICHIGAN

METHOD OF AND APPARATUS FOR MANUFACTURING PNEUMATIC TIRES

Application filed March 15, 1928. Serial No. 261,830.

This invention relates to method of and apparatus for manufacturing pneumatic tires, but more particularly the continuous assembling of certain elements such as the tread and a rubber coated fabric known as a breaker.

It is becoming common practice among tire manufacturers to tube or calendar the tread stock continuously and then run this stock through a tank of water or to use other means for setting it in order that suitable lengths may be cut from the strip thus formed without subsequent shrinkage or distortion before it is applied to the carcass. It is also becoming common practice to apply the breaker unit to this tread stock and in some cases cushion stock also. The usual methods employed quite generally consist of pressing the cushion or breaker stocks upon the tread stock by means of a roller. Considerable difficulty has been encountered in guiding the breaker stock in such a manner that the breaker will be located centrally with respect to the tread. In conveying the tread to the point where the breaker is applied it necessarily becomes more or less irregular due to imperfect guiding conditions and follows a sinuous path along the conveyor. Owing to the thin edges and delicate nature of the tread stock it is extremely difficult to guide it accurately enough to correct this.

The primary object of the present invention is to provide means for applying the breaker or cushion stocks accurately to the center of the tread stock regardless of the irregular line of such tread stock upon the conveyor. Further objects are to provide a simple method of guiding the breaker or cushion stocks by forming in the tread a longitudinal groove or the equivalent thereof prior to the application of the breaker and preferably at the time the tread stock is tubed or calendered.

The method forming the subject matter of the present invention is carried out in various ways but the principles thereof and an advantageous form of apparatus therefor are illustrated in the accompanying drawing, in which:

Fig. 1 is a partial side elevation;

Fig. 2 is an enlarged sectional view on the line 2—2 of Fig. 1, and

Fig. 3 is a partial side elevation of a modified form of apparatus.

Referring to the drawing the apparatus for applying the breaker to the tread is mounted on a suitable frame 5, only a small portion of which is illustrated. The tread stock 6 in the form of a continuous strip has been previously formed in a tubing machine or calender and preferably during the forming operation there has been provided in the tread a groove 7 which in the present embodiment is V-shaped and located substantially at the center of the top face of the tread and extends longitudinally thereof throughout its length. This groove may be made in any well known manner familiar to the art and is of sufficient depth to receive and accurately position a guide in the manner which will be presently described. The tread provided with the guiding groove is fed to the apparatus on a conveyor 8 in the direction indicated by an arrow in Fig. 1 and passes beneath a table 9 supported on the frame 5. The breaker 10 is fed to the apparatus in the direction also indicated by an arrow from a convenient source of supply (not shown) preferably in the form of a continuous strip.

The table 9 is pivotally mounted on a loose bolt 11 carried in a platform 12 which in turn is pivotally mounted on the frame 5 at 13. The pivotal connection at 11 permits the table 9 to swing freely in a horizontal plane and the pivotal connection at 13 permits this table to swing in a vertical plane. A supporting caster or roller 14 carries the weight of the table 9 and bears upon the tread stock passing beneath such table.

The breaker stock as it enters the apparatus passes beneath an idler roll 15 preferably located slightly above the table 9 and then between oppositely disposed pairs of guide rollers 16 and 17. These guide rollers 16 and 17 serve to keep the breaker stock in proper alignment on the table. At the outer or free end of the table 9 is located a guide roller 18 on a rod 19 and the breaker stock passes over this guide roller as it leaves the table. This roller preferably projects through a cutout portion of the table to a point slightly above the face of the table so that the breaker strip when under tension is held above the table sufficiently to prevent it riding under the edges of the guiding rolls 16 and 17. A carrier frame 20 is pivotally mounted on the rod 19 so that it is free to swing vertically and on the under face of the free end of this frame is mounted a guide member 21 which is adapted to track in the groove 7 in the tread in the manner indicated in Fig. 2. Two links 22 are pivotally connected at 23 to the carrier frame 20 and in the outer ends of these links is mounted a shaft 24 on which rotates a roller 25. The strip 10 passes beneath the roller 25 and makes contact with the tread at that point. This roller 25 is a relatively heavy one and acts to press the breaker stock upon the tread. Weights 26 on opposite sides of the carrier frame 20 press the guide 21 into the guiding groove or path 7 in the tread stock. Prior to entering the present apparatus, the breaker fabric has been coated with raw rubber which leaves it more or less tacky and therefore the pressure of the roller 25 causes it to adhere firmly to the tread. Within the carrier frame 20 is fastened a chute-like guide 27 for the purpose of guiding the breaker stock centrally with the tread underneath.

The pivotal connection at 11 of the table 9 permits the table to swing laterally and thus allows the guide 21 to follow the irregular path formed by the groove 7 and the pivotal connection at 13 permits the table to swing up and down sufficiently to enable the caster 14 to ride over various thicknesses of tread stock. Similarly the pivotal connections at 19 and 23 permit a vertical swinging of the guide 21 and the roll 25 respectively, to provide free movement upon the tread passing beneath, regardless of slight inequalities in thickness or varying depth of the groove.

In the present embodiment the guide 21 is in the form of a thin dull blade through any other suitable form of member as for example a rotating disc which would track in the groove may be substituted therefor.

In Fig. 3 of the drawing is shown a modification in which the supporting caster and carrier frame of the previous embodiment have been eliminated. The table 30 corresponding to the table 9 has the guide 31 which follows the groove in the tread mounted directly on its outer or free end. The roller 32 which presses the breaker stock 10 on the tread is mounted in oppositely disposed arms 33 depending from the frame 5, the shaft 34 on which the roller is mounted being vertically movable in slots 35 to enable the roller to move up and down as it passes over different thicknesess of tread. A chute 36 is provided on the table 30 to insure the proper alignment of the breaker stock as it leaves this table. The table is pivoted to permit lateral and vertical movement as in the case of the embodiments of Fig. 1.

In the operation of the device the tread 6 and the breaker stock 10 are advanced at the same rate. A continuous flow of calendered or tubed tread stock is met with a continuous strip of spliced breaker fabric, rolled together at the point of contact with the pressing roll and centrally guided thereto through the riding of the guide within the groove of the tread stock. While this groove has been shown and described as located in the center of the tread, it will be readily evident that it may be located in any other portion of the tread so long as the guide is connected to the table in a manner to cause the breaker or cushion stocks to be fed to the tread in the proper relation. This guiding groove in the tread may also be utilized for feeding other stocks on to different zones of the tread in the same manner. It is an easy matter to accurately locate the groove in the tread as it is being calendered or tubed and when once provided the proper disposition of the breaker stock is insured irrespective of the path the tread may assume on the conveyor. The groove does not in any way injure the tread as the rubber is still in its raw or unvulcanized condition. After the breaker stock has been applied the combined elements may be cut to suitable length for the tire to be built. This eliminates the separate booking of each element and saves the time usually required by the tire builder to apply the breaker stock separately to the tire carcass.

It will be recognized from the foregoing description that the method and apparatus are simple and effective and a superior article is produced at a material saving in time and labor.

Having thus described my invention what I claim and desire to protect by Letters Patent is:

1. The method of assembling elements of a pneumatic tire which comprises forming a guide on one of said elements and applying another of said elements to the first element with the relative position of the elements during the application determined by said guide.

2. The method of assembling elements of a pneumatic tire which comprises forming a guide groove on one of said elements and applying another of said elements to the first element with the relative position of the elements during the application determined by said groove.

3. The method of assembling elements of a pneumatic tire which comprises forming a guide in one of the elements during the formation of the element and applying another of said elements to the first mentioned element with the relative position of the elements determined by said guide.

4. The method of assembling elements of a pneumatic tire which comprises forming a guide on one of the elements extending longitudinally of the element and parallel with the center line thereof and applying another of said elements to the first mentioned element with the relative position of the elements during the application determined by said guide.

5. In the manufacture of pneumatic tires, the method of assembling the tread and the breaker comprising forming a guiding groove in the tread extending longitudinally thereof and parallel with its center line, and applying the breaker to the tread while maintaining the breaker in proper position relative thereto by means of said groove.

6. In the manufacture of pneumatic tires, the method of assembling tire elements which consists in shaping tread stock in a continuous strip with a guide groove in one face thereof parallel with the longitudinal axis of the strip, and applying breaker stock in strip form to the shaped tread stock with said groove acting to determine the relative position of these elements.

7. In the manufacture of pneumatic tires, the method of forming and assembling tire elements which consists in calendering tread stock in a continuous strip, forming a guide groove in the strip parallel with the longitudinal axis thereof, and applying breaker stock in the form of a continuous strip to said tread strip by longitudinally advancing the two strips in substantially the same direction with the breaker strip centered relative to the tread strip by said groove and bringing the strips into contact while thus centered.

8. Apparatus for building pneumatic tires including means for longitudinally advancing a strip of tread stock and means guided by said tread stock for applying tire elements to said strip during the advance thereof.

9. Apparatus for manufacturing pneumatic tires including means for longitudinally advancing a tread strip and means guided by the tread strip for applying a breaker strip upon said tread strip during the advance thereof.

10. Apparatus for building pneumatic tires including a conveyor for longitudinally advancing a strip of tread stock, and means movable relatively to said conveyor and guided by the tread strip thereon for applying tire elements to said strip during the advance thereof.

11. Apparatus for building pneumatic tires including a conveyor for longitudinally advancing a strip of tread stock, shiftable means for conducting a breaker strip to the advancing tread strip and depositing it thereon, and means guided by the tread strip for positioning said conducting means relative to said tread strip.

12. In apparatus for building pneumatic tires, a conveyor for longitudinally advancing a strip of tread stock, a table disposed above said conveyor and movable relative thereto for conducting a breaker strip to and depositing it upon said tread strip during the advance thereof, and a guide member on said table coacting with the advancing tread strip to position the discharge end of said table relative to said tread strip.

13. In apparatus for building pneumatic tires, a conveyor for longitudinally advancing a strip of tread stock, a table disposed opposite said conveyor and movable relative thereto for conducting a breaker strip to and depositing it upon said tread strip during the advance thereof, a guide member on said table coacting with the advancing tread strip to center the discharge end of said table relative to said tread strip, and means for pressing the breaker strip upon the tread strip.

14. An apparatus for assembling multiple ply assemblies of strip material which comprises in combination means for longitudinally advancing at least one strip of the assembly, and means guided by the advance of the first mentioned strip for applying another strip in properly centered relation thereto.

15. A method of assembling multiple ply slabs which involves the steps of advancing a strip of material longitudinally, guiding a second strip of material by the advance of the first strip of material so as to arrange the second strip of material in superposed properly centered relation with respect to the first strip of material.

Signed at Detroit, county of Wayne, State of Michigan, this 9th day of March, 1928.

ADRIAN O. ABBOTT, JR.